US011321735B2

(12) United States Patent
Boos et al.

(10) Patent No.: US 11,321,735 B2
(45) Date of Patent: May 3, 2022

(54) METHOD AND DEVICE FOR CONTROLLING THE ISSUING OF PRODUCT-RELATED ADVERTISING MESSAGES TO CUSTOMERS IN SALES FACILITIES

(71) Applicants: Herbert Boos, Kelkheim (DE); Florian Meyer, Cologne (DE)

(72) Inventors: Herbert Boos, Kelkheim (DE); Florian Meyer, Cologne (DE)

( * ) Notice: Subject to any disclaimer, the term of this patent is extended or adjusted under 35 U.S.C. 154(b) by 389 days.

(21) Appl. No.: 15/396,127

(22) Filed: Dec. 30, 2016

(65) Prior Publication Data

US 2017/0109782 A1    Apr. 20, 2017

Related U.S. Application Data

(63) Continuation-in-part of application No. PCT/EP2014/001805, filed on Jul. 2, 2014.

(51) Int. Cl.
*G06Q 30/00* (2012.01)
*G06Q 30/02* (2012.01)
*G06Q 20/32* (2012.01)

(52) U.S. Cl.
CPC ..... *G06Q 30/0251* (2013.01); *G06Q 20/3224* (2013.01); *G06Q 30/02* (2013.01)

(58) Field of Classification Search
CPC . G06Q 30/0251; G06Q 20/3224; G06Q 30/02
See application file for complete search history.

(56) References Cited

U.S. PATENT DOCUMENTS

| | | | |
|---|---|---|---|
| 5,923,252 A | 7/1999 | Sizer | |
| 5,974,396 A * | 10/1999 | Anderson | G06Q 30/0204 705/14.27 |
| 7,930,204 B1 * | 4/2011 | Sharma | G06Q 30/02 705/7.32 |
| 8,009,863 B1 * | 8/2011 | Sharma | G06Q 30/02 382/107 |
| 8,035,491 B2 * | 10/2011 | Banks | H04L 1/1867 340/539.21 |
| 8,274,396 B2 * | 9/2012 | Gurley | G01S 11/02 340/572.1 |
| 2004/0103028 A1 * | 5/2004 | Littman | G07F 9/023 705/14.58 |
| 2005/0039206 A1 * | 2/2005 | Opdycke | G06Q 30/0277 725/23 |
| 2005/0055275 A1 * | 3/2005 | Newman | G06Q 30/0207 705/14.1 |

(Continued)

FOREIGN PATENT DOCUMENTS

EP    1 845 490    10/2007

*Primary Examiner* — Luis A Brown
(74) *Attorney, Agent, or Firm* — Klaus J. Bach

(57) ABSTRACT

In a method and a device for controlling the issuing of advertising messages in a sales facility, wherein boundary condition data such as weather conditions and temperature data are detected by means of detection devices arranged inside and outside the sales facility and correlated with effective quantities of sold products promoted by advertising messages. The issuing of advertising messages is triggered in a targeted manner as a function of the results achieved when the boundary conditions determined to be optimal are occurring.

11 Claims, 1 Drawing Sheet

(56) References Cited

U.S. PATENT DOCUMENTS

| | | | |
|---|---|---|---|
| 2006/0131401 A1* | 6/2006 | Do | G06Q 30/02 235/383 |
| 2007/0011051 A1 | 1/2007 | Findlay | |
| 2007/0192183 A1* | 8/2007 | Monaco | G06Q 30/0226 705/14.27 |
| 2007/0278299 A1* | 12/2007 | Overhultz | G06F 3/147 235/383 |
| 2008/0059307 A1* | 3/2008 | Fordyce III | G06Q 30/02 705/14.27 |
| 2008/0074264 A1* | 3/2008 | Sharpe | G06Q 30/02 340/572.1 |
| 2008/0189170 A1 | 8/2008 | Ramachandra | |
| 2008/0281687 A1* | 11/2008 | Hurwitz | G06Q 30/0255 705/14.1 |
| 2009/0184843 A1* | 7/2009 | Shaffer | G08G 1/096741 340/815.4 |
| 2009/0259540 A1* | 10/2009 | Phan | G06Q 30/0241 705/14.73 |
| 2010/0073148 A1* | 3/2010 | Banks | H04L 1/1867 340/286.02 |
| 2010/0151821 A1* | 6/2010 | Sweeney | H04W 4/02 455/410 |
| 2010/0211431 A1* | 8/2010 | Lutnick | G06Q 30/0212 705/14.12 |
| 2011/0060652 A1* | 3/2011 | Morton | H04W 4/021 705/14.58 |
| 2011/0093339 A1* | 4/2011 | Morton | G06Q 30/02 705/14.58 |
| 2011/0112892 A1* | 5/2011 | Tarantino | A63F 13/332 705/14.1 |
| 2011/0119132 A1* | 5/2011 | Morton | G06Q 30/0261 705/14.58 |
| 2011/0231236 A1* | 9/2011 | Gonzalez | G06Q 30/0238 235/375 |
| 2012/0022930 A1* | 1/2012 | Brouhard | G06Q 30/0229 705/14.3 |
| 2012/0022944 A1* | 1/2012 | Volpi | G06Q 30/0237 705/14.1 |
| 2012/0029691 A1* | 2/2012 | Mockus | H04W 4/02 700/231 |
| 2012/0030006 A1* | 2/2012 | Yoder | G06Q 30/0207 705/14.41 |
| 2012/0185335 A1* | 7/2012 | Tsirtsis | G06Q 30/0267 705/14.64 |
| 2012/0197705 A1* | 8/2012 | Mesaros | G06Q 30/0224 705/14.23 |
| 2013/0275215 A1* | 10/2013 | LeBlanc | G06Q 30/0255 705/14.53 |
| 2016/0321696 A1* | 11/2016 | Murthy | G06Q 30/0267 |

* cited by examiner

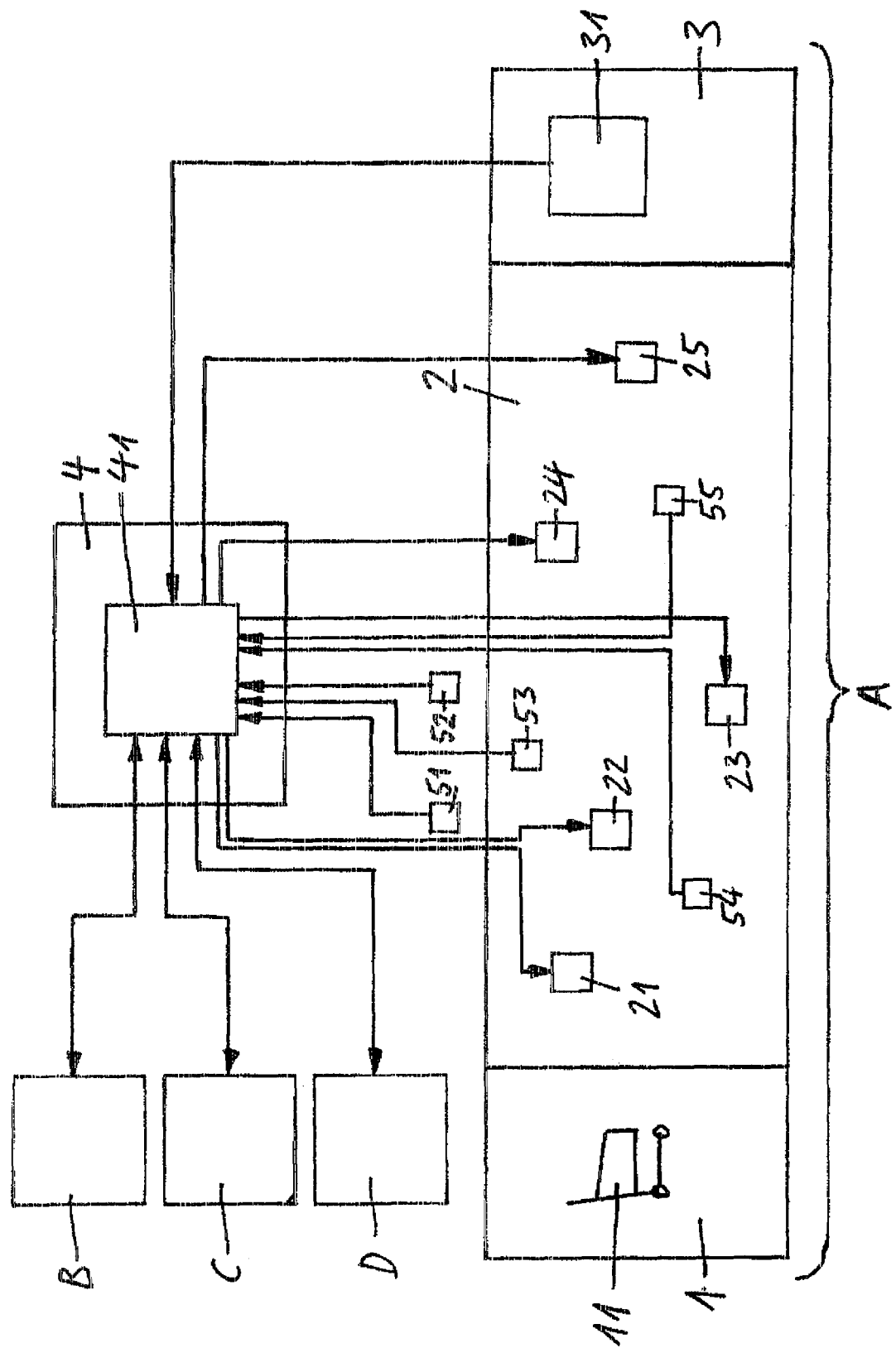

METHOD AND DEVICE FOR CONTROLLING THE ISSUING OF PRODUCT-RELATED ADVERTISING MESSAGES TO CUSTOMERS IN SALES FACILITIES

This is a continuation-in-part patent application of pending international patent application PCT/EP2014001805 filed Jul. 2, 2014.

The present invention relates to a method and a device for controlling the issuing of product-related advertising messages in sales facilities in order to optimize the efficiency of addressing customers with advertising messages of this type.

It is common practice in sales facilities, such as supermarkets, to address customers currently present in the market with advertising messages, for example by announcing advertising spots for current promotions or special offers by means of loudspeakers in specific intervals. It is also common to use advertising messages presented to customers in sales facilities in a product-related manner in the form of video presentations on monitor displays; this is especially the case in DIY markets and other sales facilities of this type, where customers are addressed with videos presenting a specific product, for example a tool, or its use. Advertising messages of this type may be presented continuously, in part only when a customer passing by is detected by a sensor which then triggers the issuing of the advertising message, or in part only after an active request by the customer.

It is also known to lead customers through a sales facility and to address them in a targeted manner with advertising messages as follows: In the entrance area of a sales facility customers may, for instance, be able to input information on the type of goods they are especially interested in into a terminal display. They may then, after identification, for example by means of a transponder incorporated into the shopping cart, be tracked by a computer system and recognized by means of this identification in selected areas of the sales facility, where they may be addressed with advertising messages in a targeted manner and/or be pointed to relevant products. This is however expensive and requires active participation of the customer—a fact that may be realistically expected only in a facility that the customer already visits with a specific purchase intention, for example in DIY stores or gardening centers. This type of addressing customers will however not be very efficient and promising in the area of food and drink markets.

It is an object of the invention to provide a method and a device that enhance, and also evaluate, the efficiency of product-related advertising messages for customers, in order to be able to present advertising messages aimed at boosting sales success to customers in a more targeted manner.

SUMMARY OF THE INVENTION

In a method and a device for controlling the issuing of advertising messages in a sales facility, wherein boundary condition data such as weather conditions and temperature data are detected by means of detection devices arranged inside and outside the sales facility and correlated with effective quantities of sold products promoted by the advertising messages, the issuing of advertising messages is triggered in a targeted manner as a function of the results achieved when the boundary conditions determined to be optimal are occurring.

The invention is based on the thought that it might be reasonable to adapt advertising messages in a more thorough manner to the respective disposition and state of the customer, in order to enhance efficiency. In contrast to advertising messages that are announced in a unspecific manner and only point customers to currently valid special offers or the like, or only present a specific product to customers because of their presence in the respective area of the sales facility, the invention aims at providing the possibility to take into account the current disposition of the customer along with further boundary conditions, and to place an advertising message, as a function of these conditions, in a targeted manner and in such a way that the customer is addressed by it at a moment where he might especially be disposed to purchase a specific product.

According to the invention this comprises the recording and collecting of data that, in light of past experience, have influence an the disposition of the customer. These data include e.g. day of the week, time of day and weather conditions. In the early morning of a working day, for example, a possibly underslept customer who is also in a hurry is less receptive to an advertising message than he is when he is a relaxed in the evening after work. And boosting the sales of ice cream is for example more easily achievable in hot weather conditions in the summer than it is in cold weather conditions. Conditions that can influence the receptiveness if the customer to advertising messages also include the current local conditions at the sales facility. In areas currently crowded and rushed with customers the addressing of customers, especially by means of video messages, is not very efficient, since it is almost impossible to notice all those messages.

According to the invention it is thus provided to detect external data of a purchase situation in order to be able to estimate state and disposition of the customer and at the same time control customer behavior. This may be achieved by providing the customer, when he enters the sales facility in an entrance or check-in area, with an individualizing identification for the time of the shopping visit. A few examples for this identification may be a trackable ID of a shopping cart or shopping basket, or a voucher handed to the customer and containing an ID. By tracking the customer in this way, even if in an anonymized manner, and by associating the ambient data at the time of purchase, and later the result of the purchase recorded at check-out, it can be detected if and to what extent a product-related advertising message presented to the customer in the course of his shopping visit has led to a successful sale. It can then also be determined if larger crowds of customers are present in specific areas of the sales facility, or only individual customers.

If such data are recorded over a longer period, with different ambient conditions and for a plurality of customers individualized in the above-mentioned manner, it can then be determined by corresponding evaluation under which external conditions an advertising message relating to a specific product is most likely to reach the customers.

The quality of this evaluation may be enhanced further by collecting and evaluating not only data from one supermarket, but by effecting collection and evaluation of data from a plurality of supermarkets in a central system, thereby rendering the evaluation even more objective.

Based on these evaluations the presentation of product-related advertising messages to customers may then be controlled in such a way that, in the presence of favorable external ambient conditions such as weather conditions, day of week, time of day and temperature, the respectively most appropriate product is prominently suggested to the customer, thereby boosting the sale of specific products at times when the conditions are especially favorable for their sale.

Since the results of a purchase are also recorded at check-out points, the control signal (=advertising message) may be optimized with the method and the device according to the invention in the same way as in a technical control loop under control of output (=result of purchase).

BRIEF DESCRIPTION OF THE DRAWINGS

The sole FIGURE shows schematically a check-in area of a sales facility.

The invention will now be described below in greater detail with reference to the appended schematic drawing. The drawing shows a sort of flow diagram of the operational sequence of the method according to the invention, from which also follows the device necessary for its execution.

The drawing shows four main blocks, i.e. an entrance or check-in area 1 of a sales facility, e.g. of a supermarket, a selling area 2 of the sales facility, being a sales room or a totality of several sales rooms, and a cashpoint area 3 as well as a central data processing area 4.

According to the respective functions, block 1 represents the area of individualization of customers. block 2 the area of action or customer addressing, block 3 the area of record, where sales records are associated with the respective customers, and block 4 the area of acquisition, recording, storing, accumulation and processing of data, and for controlling advertising messages.

Blocks 1 to 3 are typically areas of a sales facility, such as a super market, a department store or a market. Block 4 or the data processing area can be associated with a single sales facility only, or with a plurality of sales facilities.

In the entrance area 1 an individualization of customers is effected by providing the customers with an identification for the time of their presence in the sales facility, this identification allowing the association of the customers with their respective shopping behavior and their actual purchases during their presence in the sales facility. Customer identification is of course anonymized. The identification for the time of shopping visit might be effected by the customer taking a shopping cart 11 from the depot, the shopping cart being provided with an identification. The shopping cart could, for example, be provided with a number so that the number of the shopping cart can be detected by the cashier staff in the cashpoint area 3 and associated to the sales receipt data. Advantageously, the identification is provided an the shopping carts by means of barcodes or by transponders, in order to allow electronic tracking of the identification not only in the cashpoint area 3, but also in selected areas of the sales facility. Other types of identification are also conceivable, such as issuing vouchers provided with an identification or the like which the customer may then present at the check-out point to receive a specific benefit.

The identification assigned to the customer may at the same time be transferred to the data processing area 4, for example when the customer takes a shopping cart 11 from the depot and the cart 11 is provided with an electronically trackable identification. The time of identification may then also be recorded.

Ambient data, such as weather conditions, air Pressure, air humidity, outside temperature, temperature in the sales facility, or other data that may be of relevance for the purchasing behavior of the customer, are additionally transferred to the data processing area 4. These data are Input into a data processing system 41 in the data processing area either automatically, for example by means of measuring devices 51, 52, 53 or the like, or fed into it in the form of messages or entered manually in specific intervals. Day of week, date and time of day are of course available for association in the data processing system 41 anyhow.

Local conditions in the sales facility, such as customer frequency or noise level, may also be detected by appropriate devices 54, 55 and then transmitted to the data processing area 4.

In the sales area 2 defining the action area, in particular the addressing of the customer with advertising messages is effected, their issuing being controlled by the data processing system 41 in the data processing area 4. These advertising messages can be acoustic messages, i.e. public announcements, audiovisual messages, i.e. messages containing picture and sound, such as video clips, or slideshows with corresponding text, or only visual messages, such as presentations by means of monitor displays. These advertising messages may be issued by means of respectively appropriate output media 21, 22, 23, 24, 25, such as loudspeakers distributed in the sales area loudspeakers arranged in the vicinity of a specific promoted product, video monitors or projection screens. Such an advertising message may however also consist only in a temporarily accentuated presentation of a specific product, for example in accentuating a specific product with light effects, such as flashing with strobe light or illuminating it with colored light.

These advertising messages may either be issued in a general, untargeted manner, or be triggered in a targeted manner when a customer approaches the respectively promoted product, in order to specifically capture the attention of the customer.

The especially effective, however also somewhat more expensive possibility of immediately addressing a customer in a targeted manner when he approaches a promoted product can be controlled either by detecting the individualizing identification of the customer, for example by means of a transponder arranged on the shopping cart 11, thereby also allowing to detect and record in the data processing area 4 which customers actually have passed by the promoted product; or the approaching of a customer can be detected by light barriers or by means of electronic detection of the presence of a metallic shopping cart.

In the cashpoint area 3, the purchases of customers are recorded at the cash register 31 and associated with the individualized customers. The identification of the customer, for example by means of the shopping cart 11, can again be tracked electronically and automatically in the cashpoint area 3. It is however also possible that the cashier records the data, for example by reading a number fixed to the shopping cart and entering it manually. Purchases recorded by the cash register are transferred to the data processing area 4 and associated with the customer. It is possible to filter only the data of currently promoted products of interest from all the purchase data in the data processing area, or to program or control the cash register in such a way that it only transfers the data for the currently promoted products to the data processing area.

Although an individualization of the customer as described above is advantageous and expedient, it is not necessary in case of a simplified implementation of the concept according to the invention. Recording the successful purchases at the cashpoints is however of central importance in order to be able to correlate the sales figures of a specific promoted product or several promoted products with the respective boundary conditions, and to thus determine at which moments and under which external conditions addressing the customer to promote a specific product is especially effective and optimally boosts sales success. Quality and significance will be especially high if data of a plurality of sales facilities are recorded and evaluated by a central data processing area 4.

The data are collected, accumulated over periods of time and evaluated in the data processing area.

In the exemplary embodiment shown, the data processing area is associated with a plurality of sales facilities. Blocks 1, 2 and 3 shown in the schematic drawing together form a sales facility A. Further sales facilities connected to the common data processing area 4 are identified as blocks B, C, D . . . N.

Evaluation of the boundary condition data and sales success data supplied by the different sales facilities is effected by correlating sales data with the respective boundary condition data. This means that sales data to which respectively current and detected boundary conditions are associated are added up in association with a respective category of boundary conditions, i.e. a specific temperature range, a specific time slot in the course of the day, a specific day of week, specific weather conditions such as sunshine or rain, or the like. Since such categories of boundary conditions, like ranges of ambient temperature, ranges of room temperature, weather conditions, time slots during the day etc. repeatedly occur, either regularly or occasionally, it is possible to precisely determine, by collecting such data over a specific period, at which times of the day, under which temperature conditions, wider which weather conditions or the like a specific product can most effectively be sold.

It is accordingly possible to issue advertising messages in a more targeted manner an the basis of values determined in this manner and aimed at optimizing efficiency for the products to be promoted.

From an economical point of view, the use of the concept according to the invention will lead to a significant increase of product sales.

The invention claimed is:

1. A method for controlling the issuing of advertising messages in sales facilities, wherein product-related advertising messages are provided for use as required and output media for issuing the advertising messages in the sales facility are provided, the method comprising the following steps:
   acquiring boundary condition data such as day of week, time of day, outside temperature, temperature in the sales room, air pressure, air humidity and weather conditions during business hours, and temporarily storing these data in a data processing system,
   issuing product-related advertising messages from the data processing system to output media located in the sales facility in order to promote specific selected products,
   detecting the effective quantity of promoted products sold, including recording the time of selling, associating the boundary condition data collected at the respective time of selling with the respective sales of the advertised products by the data processing system in a cashpoint area of the sales facilities on the basis of cash register data,
   collecting and storing of sales data with respectively associated boundary condition data by the data processing system cumulatively over a period of time,
   evaluating the collected sales data and determining the boundary conditions under which promoted products are particularly frequently sold by the data processing system, and
   controlling by the data processing system the issuing of advertising messages relating to the respective product, during the presence of a boundary condition that has been determined to boost sales,
   wherein, in an entrance area of the sales facility, an individualizing identification is assigned to a customer in the form of a technically readable or detectable ID of a shopping cart or a shopping basket used by the customer for tracking the customer during a shopping trip, and this identification is also assigned to the recorded and collected purchase data or items thereby providing for personal anonymity of the customer using the shopping cart or basket.

2. The method according to claim 1, wherein the method steps are carried out centrally for a plurality of sales facilities.

3. The method according to claim 1, wherein the presence of a customer provided with an individualized identification is technically detected in selected places of the sales facility, and, as a function thereof, the issuing of an advertising message for addressing the customer in an individualized manner is triggered.

4. The method according to claim 1, wherein additional parameters, such as for example current customer frequency or noise level, are detected in the area of output media in the sales facility and taken into account for controlling the issuing or the advertising messages.

5. A device for controlling the issuing of advertising messages in sales facilities for carrying out the method according to claim 1, with a data processing system (41) including a storage memory for storing product-related advertising messages, and with a programmable device for controlling the issuing of these advertising messages on output media (21, 22, 23, 24, 25) distributed in the sales facility,
   further with detectors (51, 52, 53) for detecting boundary condition data such as outside temperature, sales room temperature, air pressure, air humidity and weather conditions, and for transferring these data to the data processing system (41) for the temporary storage of such boundary condition data,
   further with recorders (31) for recording sales data for the products promoted by means of the advertising messages from cash register data and for associating them with boundary condition data respectively occurring at the time of detection,
   further with devices for collecting, storing and correlating the product sales data with associated boundary condition data in order to determine those boundary conditions, under which specific products promoted by advertising messages are particularly frequently sold, and
   with a controller for controlling the issuing of advertising messages promoting a specific product in all cases where boundary conditions occur for which particularly frequent purchases of the respective product have been determined to occur, wherein, in the entrance area of the sales facility, shopping carts (11) and shopping baskets are provided with technically readable identification elements such as transponders incorporated into the shopping carts (11) and shopping baskets for temporary individualized identification of a customer based on a particular shopping cart or basket during a shopping visit while maintaining personal anonymity of the customer.

6. The device according to claim 5, with detectors (54, 55) arranged in the sales facility for detecting the current conditions in selected places of the sales facility, such as current customer frequency or noise level, and transmitters for transferring these data to the data processing system (41).

7. The device according to claim 5, with sensors arranged in selected areas of the sales facility, to read out the individualized identification of customers and to control the triggering of advertising messages as a function thereof for the purpose of addressing customers in an individualized manner.

8. The device according to claim 5, wherein the data processing system (41) is associated with a plurality of sales facilities, to effect the collection and evaluation of data from several sales facilities in a centralized manner and to control the issuing of advertising messages in the several sales facilities in a centralized manner.

9. The device according to claim 5, wherein the detection means for detecting boundary condition data are measuring devices arranged inside and/or outside the sales facility, and/or reception devices for externally transferred data.

10. The device according to claim 5, wherein the output media arranged in the sales facility are loudspeakers, video monitor devices, and/or projectors with associated projection screens.

11. The device according to claim 5, wherein the means for collecting, storing and controlling the product sales data with associated boundary condition data in the data processing system (41) continually refine the optimal boundary condition data for the sale of a product promoted by an advertising message relating to this product, by accumulating the collected data over longer periods of time and evaluating them.

* * * * *